United States Patent [19]

Lee

[11] Patent Number: 4,955,850
[45] Date of Patent: Sep. 11, 1990

[54] SPROCKET CHAIN CLEANING DERAILLEUR WHEEL

[76] Inventor: Glen Lee, 7777 W. 91st St. Unit E3146, Playa del Rey, Calif. 90293

[21] Appl. No.: 418,848

[22] Filed: Oct. 10, 1989

[51] Int. Cl.$^5$ .............................................. F16H 57/00
[52] U.S. Cl. .................................... 474/92; 15/256.5; 198/496
[58] Field of Search ............................ 474/92, 79–82; 184/15.1; 15/256.5, 256.6; 280/261, 293; 198/494, 496

[56] References Cited

U.S. PATENT DOCUMENTS

| | | | |
|---|---|---|---|
| 584,238 | 6/1897 | Reagan | 474/92 |
| 628,087 | 7/1899 | Gibford | 474/92 |
| 648,866 | 5/1900 | Gibford | 474/92 |
| 3,931,991 | 1/1976 | Marchello | 474/92 |
| 4,593,923 | 6/1986 | Thalmann | 474/92 |

Primary Examiner—Thuy M. Bui
Attorney, Agent, or Firm—Lawrence N. Ginsberg

[57] ABSTRACT

A derailleur wheel is disclosed for use with a vehicle utilizing a sprocket chain derailing system. The derailleur wheel has a centrally disposed circular sprocket and first and second circular side faces located on each side of the circular sprocket. A plurality of cleaning brushes are secured to the side faces. The brushes preferably comprise a plurality of tufts of bristles. The cleaning bristles are radially spaced apart and extend in a radially outward direction, thereby resulting in the cleaning of the sprocket chain by the brushing of the bristles against the sprocket chain during use of the vehicle.

14 Claims, 1 Drawing Sheet

SPROCKET CHAIN CLEANING DERAILLEUR WHEEL

BACKGROUND OF THE INVENTION

1. Field of the Invention

The present invention relates to vehicles utilizing sprocket chain derailing systems and more particularly to a cleaning mechanism for the sprocket chain of such a vehicle.

2. Description of the Related Art

Because bicycle chains are exposed to dust and dirt during normal use, it is necessary for maintaining proper chain operation and achieving long service life, to clean and lubricate the chain periodically. Proper care of the drive chain is important for all bicycles and is especially important for multi-speed bicycles which use a derailleur-type speed shifting mechanism. However, accomplishing thorough and effective cleaning of the drive chain has usually required that the chain be removed from the bicycle and immersed in a solvent and cleaned manually to remove all accumulated dust and grit from the chain, after which the chain is reinstalled on the bicycle. Because such cleaning of drive chains is quite time consuming, requires special tools to open the chain, and is a dirty operation, it is usually not performed as frequently as is desirable.

Various devices for cleaning bicycle chains have been proposed, but they have either been relatively ineffective or have exhibited various disadvantages in their use. For example, U.S. Pat. No. 4,578,120, issued to Michel A. Chiarella and U.S. Pat. No. 4,593,923 issued to Robert Thalmann disclose use of an enclosed self-contained device located between the derailleur assembly and the crank sprocket for the pedals. The self-contained devices in these patents use solvent reservoirs and brush members which are adapted to contact the chain and clean the same. These systems are relatively complex and must be attached when the bicycle is not being used. Since solvents are used, the chain should be relubricated after every cleaning.

It is therefore a principal object of the present invention to provide real-time cleaning of sprocket chain used in vehicles having sprocket chain derailing systems.

It is another object to provide low cost, efficient cleaning of such sprocket chains.

SUMMARY OF THE INVENTION

These and other objects of the present invention are accomplished by the present invention which is a derailleur wheel for use with a vehicle utilizing a sprocket chain derailing system.

The derailleur wheel has a centrally disposed circular sprocket and first and second circular side faces located on each side of the circular sprocket. A plurality of cleaning brushes are secured to the side faces. The brushes preferably comprise a plurality of tufts of bristles. The cleaning bristles are radially spaced apart and extend in a radially outward direction, thereby resulting in the cleaning of the sprocket chain by the brushing of the bristles against the sprocket chain during use of the vehicle.

By locating the cleaning means on the derailleur wheels, the sprocket chain is cleaned as the vehicle is being used. Therefore, the user does not need to expend time in cleaning the chain after use and re-lubricating the chain after cleaning. Furthermore, the life of the chain, sprocket wheels and derailleur assembly is extended because the chain is constantly being cleaned, debris being removed. Additionally, inasmuch as the derailleur of a bicycle is typically located beneath the sprocket gear wheels, debris will fall to the roadside rather than being recycled back to the sprocket gear wheels.

BRIEF DESCRIPTION OF THE DRAWINGS

The same elements or parts throughout the figures of the figures of the drawings are designated by the same reference characters.

DETAILED DESCRIPTION OF THE INVENTION

Figure 1:
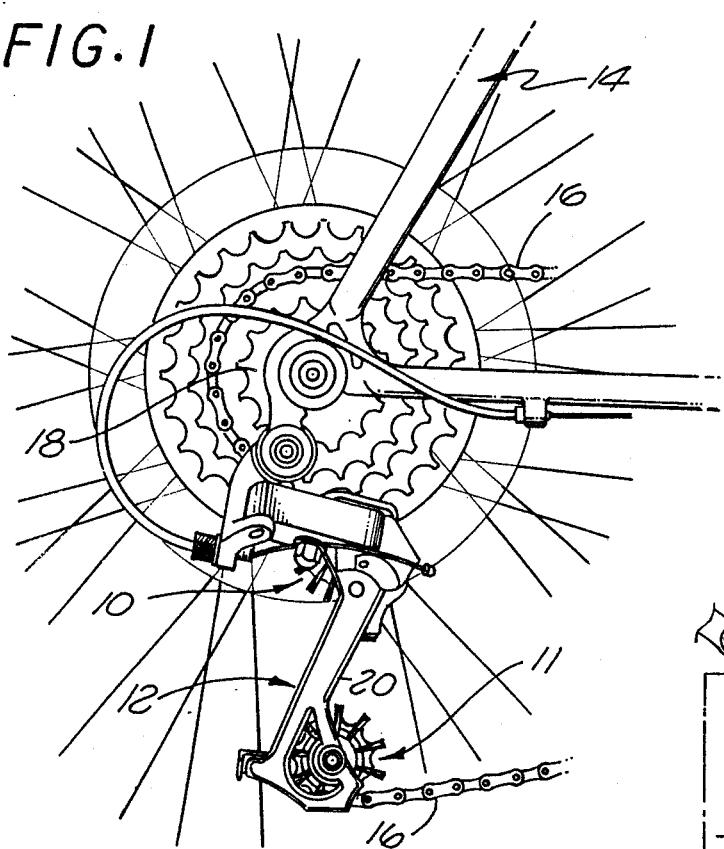
FIG. 1 is a side elevation view of the rear portion of a gear system of a bicycle showing the implementation of the present invention.

Referring to the drawings and the characters of reference marked thereon, FIG. 1 illustrates derailleur wheels of the present invention, designated generally as 10, 11. Derailleur wheels 10, 11 are shown mounted on a conventional derailleur assembly 12 for a bicycle frame 14.

The chain 16 passes around the sprocket drive wheel 18 to the derailleur assembly 12. The derailleur assembly 12 includes a frame 20 for supporting the upper and lower derailleur wheels 10, 11.

Figure 2:
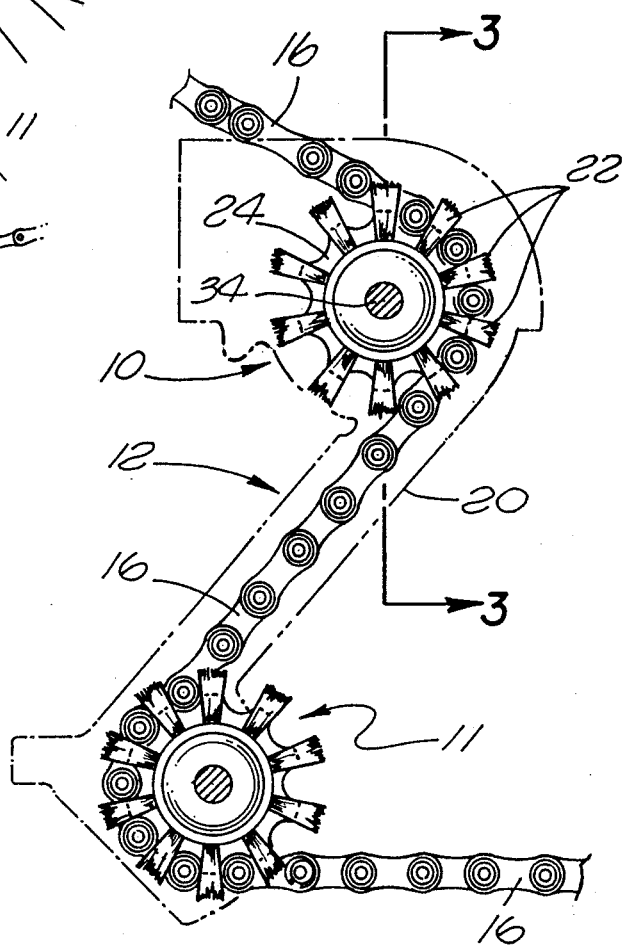
FIG. 2 is an enlarged side elevation view of the derailleur assembly and derailleur wheel of the present invention.

Referring now to FIG. 2, it can be seen that the chain 16 passes around the upper derailleur wheel 10 and then around wheel 11 whereupon it is directed toward the front of the bicycle. Each derailleur wheel 10 contains a plurality of radially spaced apart tufted bristles 22 which extend in a radially outward direction. The bristles 22 brush against the sprocket chain 16 during use of the bicycle thereby cleaning the sprocket chain 16.

The length of the bristle tufts are approximately equal to the thickness of the chain being cleaned. It will be understood that as the chain moves around each derailleur wheel 10, 11, bristle tufts 22 are forced into the various interstitial spaces formed in the chain 16.

Figure 3:
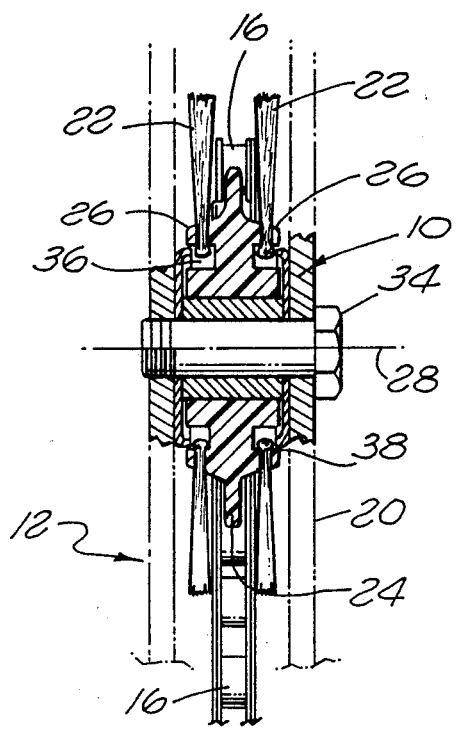
FIG. 3 is a front view of a portion of the derailleur assembly, partially in cross section, taken along line 3—3 of FIG. 2.

Referring now to FIG. 3, a partial cross sectional view of a portion of the derailleur assembly 12 is illustrated. The derailleur wheel 10 includes a centrally disposed circular sprocket 24 and first and second side faces 26. As shown in this figure, each side face approaches an angle which is substantially parallel to the axis 28 of the circular sprocket 24. However, it is understood that the side face 26 may be disposed at various other angles so long as the bristle tufts 22 can be arranged to engage the chain during movement of the chain during use.

The derailleur wheel 10 is rotatably connected to the derailleur frame 20 through a bushing 30, spacers 32 and bolt 34.

Each bristle tuft 22 is disposed in a respective bristle tuft hole 36 formed in a side face 26. Each bristle tuft preferably contains between 11 and 20 bristles, depending on the gauge of the bristles. The bristles are secured within the holes by staples 38, securement being provided by conventional staple set means. Typically, the cleaning bristles are formed of nylon, each having a thickness between 0.005 inches and 0.015 inches. Nylon is preferably used for its memory retention qualities.

During use, the whipping action of the bristles tufts 22 against various portions of the chain 16 results in the release of accumulating debris. This effect is enhanced at increased speeds in which there is a concomitant increase of centrifugal force resulting in greater dispersement of debris.

Obviously, many modifications and variations of the present invention are possible in light of the above teachings, It is therefore to be understood that, within the scope of the appended claims, the invention may be practiced otherwise than as specifically described.

Figure 4:
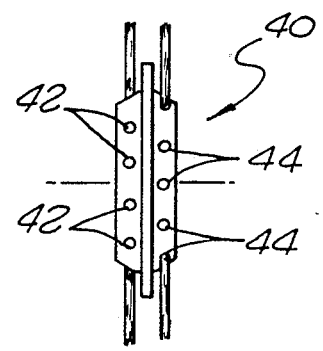
FIG. 4 is a schematic illustration of an alternate embodiment, having offset bristles.

For example, in the preceding embodiment, the bristle tuft holes 36 formed on the first side face are parallel to the bristle tuft holes formed on the second side face. However, as can be seen by reference to a second embodiment designated generally as 40 in FIG. 4, the bristle tuft holes 42 on one side may be offset from the bristle tuft holes 44 on the other side. This results in more efficient cleaning by increasing the area of brush coverage by decreasing any overlap of the bristles.

This derailleur wheel 10 is particularly adapted for use with road bicycles and all-terrain bicycles. For this reason the invention has been described in connection with this particular use. However, the derailleur wheel of the present invention can be used for other vehicles utilizing a sprocket chain derailing system.

In view of the above noted broader utility of the invention, it will be understood that this described application involving bicycles is purely illustrative and not limiting in nature.

What is claimed and desired to be secured by Letters Patent of the United States is:

1. A derailleur wheel for use with a vehicle utilizing a sprocket chain derailing system, comprising:
   (a) a derailleur wheel having a centrally disposed circular sprocket and first and second circular side faces located on each side of said circular sprocket, and
   (b) a plurality of cleaning brushes secured to said side faces, said cleaning brushes being radially spaced apart and extending in a radially outward direction, thereby resulting in the cleaning of the said sprocket chain by the brushing of said brushes against the sprocket chain during use of the vehicle.

2. The derailleur wheel of claim 1 wherein said cleaning brushes comprise a plurality of tufts of bristles.

3. The derailleur wheel of claim 2 wherein said first and second circular side faces are each substantially parallel to the axis of said circular sprocket.

4. The derailleur wheel of claim 2 wherein said vehicle is a road bicycle.

5. The derailleur wheel of claim 2 wherein said vehicle is an all-terrain bicycle.

6. The derailleur wheel of claim 2 wherein said cleaning bristle tufts are sized to interfit into openings in the chain.

7. The derailleur wheel of claim 6 wherein said side faces contain a plurality of bristle tuft holes, each hole for containing said cleaning bristle tufts.

8. The derailleur wheel of claim 7 wherein the bristle tuft holes formed on said first side face are offset from the bristle holes formed on said second side face.

9. The derailleur wheel of claim 7 wherein each of said cleaning bristles have sufficient thickness so as to retain their memory capability.

10. The derailleur wheel of claim 9 wherein said cleaning bristles are formed of nylon.

11. The derailleur wheel of claim 10 wherein said cleaning bristles have thicknesses between 0.005 inch and 0.015 inch.

12. The derailleur wheel of claim 11 wherein each bristle tuft contains between 11 and 20 bristles.

13. The derailleur wheel of claim 6 wherein the bristle tuft holes formed on said first side face are parallel to the bristle tuft holes formed on said second side face.

14. The derailleur wheel of claim 6 wherein each side face contains 10 bristle tuft holes.

* * * * *